(12) United States Patent
Nakahara et al.

(10) Patent No.: US 6,663,684 B1
(45) Date of Patent: Dec. 16, 2003

(54) DUST COLLECTING FILTER CLOTH AND BAG FILTER

(75) Inventors: Makoto Nakahara, Otsu (JP); Koji Kawakami, Osaka (JP); Takehiko Miyoshi, Mishima (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/762,018

(22) PCT Filed: Aug. 10, 1999

(86) PCT No.: PCT/JP99/04330

§ 371 (c)(1),
(2), (4) Date: Feb. 1, 2001

(87) PCT Pub. No.: WO00/09790

PCT Pub. Date: Feb. 24, 2000

(30) Foreign Application Priority Data

Aug. 10, 1998 (JP) ............................................. 10-225952

(51) Int. Cl.$^7$ .......................... B01D 39/08; B01D 46/02
(52) U.S. Cl. ............................. 55/486; 55/381; 55/382; 55/487; 55/527; 55/528; 55/529
(58) Field of Search ........................ 55/382, 381, 486, 55/487, 488, 522, 527, 528, 529, DIG. 5

(56) References Cited

U.S. PATENT DOCUMENTS 4,274,914 A * 6/1981 Keith et al. .................... 55/528
4,714,647 A * 12/1987 Shipp et al. ................... 55/487
4,983,193 A * 1/1991 Tani et al. ..................... 55/487
5,178,813 A * 1/1993 Akatsu et al. ............. 264/210.7
5,759,394 A * 6/1998 Rohrbach et al. .............. 55/529
5,820,645 A * 10/1998 Murphy, Jr. ................... 55/528

FOREIGN PATENT DOCUMENTS

| JP | 05 279948 | 10/1993 | |
| JP | 6-310 | * 1/1994 | ........... B01D/39/16 |
| JP | 06 000310 | 4/1994 | |
| JP | 09 029021 | 2/1997 | |
| JP | 9-57026 | * 3/1997 | ........... B01D/39/08 |
| JP | 09 057026 | 3/1997 | |
| JP | 10 174822 | 6/1998 | |
| JP | 11 105210 | 4/1999 | |
| RU | 2 049 524 | 12/1995 | |

* cited by examiner

Primary Examiner—Duane Smith
Assistant Examiner—Jason M. Greene
(74) Attorney, Agent, or Firm—Piper Rudnick LLP

(57) ABSTRACT

Provided are a dust-collecting filter cloth that comprises a base fabric and web, wherein at least the web includes modified cross-section fibers of polyphenylene sulfide; and a bag filter made of the filter cloth. When fitted to an exhaust gas dust collector, the bag filter involves little pressure loss and ensures increased dust-collecting efficiency. As being resistant to heat and ensuring good dust-collecting efficiency, the filter cloth is useful for dust collection.

16 Claims, No Drawings

DUST COLLECTING FILTER CLOTH AND BAG FILTER

TECHNICAL FIELD

The present invention relates to a dust-collecting filter cloth and a bag filter.

More precisely, the invention relates to a dust-collecting filter cloth and a bag filter having good heat resistance and good dust-collecting efficiency.

BACKGROUND ART

The filter for air purification includes one for internal filtration and another for surface filtration. The filter for surface filtration is used in duct collectors. For surface filtration, the filter first catches dust on its surface to form a dust layer thereon, and the dust layer then continues to catch dust thereon to increase its thickness. After its thickness has increased to a certain degree, the dust layer is removed from the surface of the filter. With that, the filter again begins to catch dust to form a dust layer on its surface, and this is repeated.

For the filter for surface filtration, heretofore used is non-woven fabric. For this, there are known a needle-punched felt of which the surface is smoothed by calendering; and a needle-punched felt coated with a silicone resin or a fluororesin to have increased lubricity for dust removal from it.

Regarding bag filters made of polyphenylene sulfide fibers of the type, a filter cloth for bag filters was proposed in Japanese Patent Laid-Open No. 57026/1997, which comprises a textile base fabric of polyphenylene sulfide fibers and a web of polyphenylene sulfide fibers. In Japanese Patent No. 2,576,599, proposed was a filter cloth for bag filters, which comprises a textile base fabric of long polyphenylene sulfide fibers and a web of polyphenylene sulfide fibers, with its surface being laminated with a porous, polyphenylene sulfide film. In Japanese Patent Laid-Open No. 165729/1998, proposed was a filter cloth for bag filters, in which the fineness of the polyphenylene sulfide fibers for the web is controlled to be at most 1.8 d.

However, the conventional filter cloths are problematic in that the amount of dust capable of being caught by them is small. This is because the cross-section profile of the single fibers used in them is circular, and the contact area thereof with dust is small. The filter cloth prepared by laminating a resin layer on a needle-punched felt has a high dust-collecting efficiency and it is easy to remove dust from it. However, this is still defective in that it the pressure loss in using it is large.

DISCLOSURE OF THE INVENTION

The object of the present invention is to provide a high-efficiency dust-collecting filter cloth for bag filter units for exhaust gas dust collection, and to provide a bag filter comprising the filter cloth.

The dust-collecting filter cloth of the invention that attains the object is essentially constituted by any of the following:

A dust-collecting filter cloth comprising a base fabric and a web, wherein at least the web comprises modified cross-section fibers of polyphenylene sulfide; or A dust-collecting filter cloth comprising a base fabric and a web with the web being disposed on the both surfaces of the base fabric, wherein at least the web comprises modified cross-section fibers of polyphenylene sulfide.

The bag filter of the invention is essentially constituted by the following:

A bag filter comprising the above-mentioned dust-collecting filter cloth.

BEST MODES OF CARRYING OUT THE INVENTION

The dust-collecting filter cloth and the bag filter of the invention are described in detail hereinunder.

To attain the object as above, or that is, to obtain a high-efficiency dust-collecting filter cloth and a bag filter comprising it, we, the present inventors have assiduously studied. Incidentally, we tried a web comprising modified cross-section fibers of polyphenylene sulfide for dust-collecting filter cloths, and, as a result, have succeeded in solving all the problems with conventional filter cloths.

The polyphenylene sulfide fibers for use in the invention have been known to have good heat resistance, chemical resistance and hydrolysis resistance, and at least 90% of the constituent units of the fibers are of a polymer having phenylene sulfide structural units of —($C_6H_4$—S)—. Accordingly, the fibers could form dust-collecting filter cloths having good heat resistance, chemical resistance and hydrolysis resistance, but it is still impossible to directly improve the filter cloths comprising them. Accordingly, in the present invention, modified cross-section fibers of polyphenylene sulfide are used for forming the web for dust-collecting filter cloths. Not involving the problem of pressure loss, the dust-collecting efficiency of the filter cloth of the invention is thereby significantly increased.

The web of 100% modified cross-section fibers of polyphenylene sulfide is preferred for increasing the dust-collecting efficiency of filter cloths, but from the economical viewpoint, the web of the filter cloth of the invention may be made of modified cross-section polyphenylene sulfide fibers blended or combined with round cross-section polyphenylene sulfide fibers. In that case, the proportion of the modified cross-section polyphenylene sulfide fibers is preferably at least 25% by weight, more preferably at least 50% by weight in view of the dust-collecting efficiency of the filter cloth.

The modified cross-section referred to herein for the profile of the polyphenylene sulfide fibers includes Y-shaped, V-shaped, U-shaped, L-shaped, triangular or cross-shaped section profiles, excluding circular or oval section profiles. Of those, preferred are Y-shaped cross-section fibers, as they are easy to card.

The fibers to constitute the web of the dust-collecting filter cloth of the invention preferably have a fineness of at most 5 d, more preferably at most 2 d, as they achieve good dust-collecting efficiency. Also preferably, at least the surface layer of the web or the surface of the web that contains the surface layer is composed of the fibers of which the fineness falls within the defined range. The fibers having a fineness of at most 5 d can form a tight felt structure, and the dust-collecting capability of the filter cloth comprising them is therefore enhanced. More preferably, the fineness of the fibers constituting the web is graded in the direction of the thickness of the web. Concretely, it is desirable that the fibers are integrated to form a laminate-structured web in such a manner that their fineness reduces by gradation in the direction of the thickness of the web to be smaller in the upper layer of the laminate structure. Needless-to-say, the fineness gradation referred to herein may be for the mean fineness of the blended or combined fibers that constitute the web. For better results, however, it is more desirable that each of the laminated fiber layers of the web have the same fineness and the fineness of the fiber layers is graded in the manner defined herein.

Any fibers will do for the core, base fabric of the filter cloth of the invention. In view of their heat resistance, however, preferred are fluorine-containing fibers, PPS fibers, polyimide fibers, glass fibers and the like. In view of their capability to be readily entangled with the web, more preferred are PPS fibers. The base fabric is a rough textile. Its warp density preferably falls between 15 and 40/inch, more preferably between 20 and 30/inch; and its weft density preferably falls between 10 and 30/inch, more preferably between 15 and 25/inch.

In the filter cloth of the invention, the web is bonded to the base fabric by entangling the fibers constituting the two. For entangling them, employed is at least one treatment of needle punching and water-jet punching. In view of the strength in entangling them, the former needle punching is preferred. However, depending on the pressure loss through the filter cloth and on the dust-collecting ability of the filter cloth, the latter water-jet punching will be preferred. As the case may be, combining the two treatments, needle punching and water-jet punching will be preferred, as producing well-balanced filter cloths. It is therefore desirable that the treatment for fiber entanglement is appropriately selected and employed herein.

Preferably, the surface of the dust-collecting filter cloth of the invention is subjected to at least one treatment of singeing and rolling. In case where the filter cloth is specifically desired to have an increased dust-collecting efficiency, it is preferably subjected to the two treatments, singeing and rolling. Concretely, the surface of the filter cloth is singed with a burner or an IR heater, and then pressed against a hot roll. Having been thus treated, at least a part of the fibers constituting the surface of the filter cloth are fused or packed tightly, or as the case may be, calendered through the combined two treatments, whereby the dust-collecting efficiency of the thus-treated filter cloth can be improved to a great extent.

The bag filter of the invention can be produced by sewing the dust-collecting filter cloth in such a manner that the surface of the filter cloth forms the dust-collecting surface of the sewed bag. The sewing thread for it is preferably made of the same fibers as those of the base fabric, chemical-resistant and heat-resistant polyphenylene sulfide fibers.

EXAMPLES

The invention is described concretely with reference to the following Examples.

Example 1

Round cross-section short fibers of polyphenylene sulfide having a fineness of 2.0 d, a fiber length of 51 mm, and a number of crimps, 14/inch were spun into double yarn having a single yarn count of 20 s, and a number of strands, 2. This was woven into plain fabric of polyphenylene sulfide. Next, while being overfed at 220° C., this was heat-set for 45 seconds to be a base fabric having a warp density of 26/inch and a weft density of 18/inch. Y-shaped cross-section fibers and round cross-section fibers all of polyphenylene sulfide having a fineness of 2.0 d, a fiber length of 51 mm, and a number of crimps, 14/inch were blended in a ratio by weight of 30/70 and formed into a web, and the web was laminated on the dust-collecting surface of the base fabric. On the back surface of the base fabric, laminated was a web of round cross-section fibers of polyphenylene sulfide having a fineness of 2.0 d, a fiber length of 51 mm, and a number of crimps, 14/inch. With that, this was needle-punched to be a needle felt. The felt was singed with a burner, and then pressed against a hot roll having a surface temperature of 200° C. The filter cloth thus obtained had a Metsuke (unit weight) of 552 g/m² and a thickness of 1.72 mm.

Example 2

In the same manner and under the same condition as in Example 1, herein obtained was a filter cloth having a Metsuke of 543 g/m² and a thickness of 1.77 mm. In this, however, the ratio by weight of the Y-shaped cross-section polyphenylene sulfide fibers to the round cross-section polyphenylene sulfide fibers was 90/10.

Example 3

In the same manner and under the same condition as in Example 1, herein obtained was a filter cloth having a Metsuke of 548 g/m² and a thickness of 1.76 mm. In this, however, the Y-shaped cross-section polyphenylene sulfide fibers constituting the web to be on the dust-collecting surface of the base fabric had a fineness of 1.5 d, a fiber length of 51 mm, and a number of crimps, 14/inch.

Example 4

In the same manner and under the same condition as in Example 2, herein obtained was a filter cloth having a Metsuke of 548 g/m² and a thickness of 1.76 mm. In this, however, the Y-shaped cross-section polyphenylene sulfide fibers constituting the web to be on the dust-collecting surface of the base fabric had a fineness of 4.0 d, a fiber length of 51 mm, and a number of crimps, 14/inch.

Comparative Example 1

Round cross-section polyphenylene sulfide filaments having a fineness of 4 d and a number of filaments, 100 were woven into plain fabric of polyphenylene sulfide. Next, while being overfed at 220° C., this was heat-set for 45 seconds to be a base fabric having a warp density of 26/inch and a weft density of 26/inch. Round cross-section polyphenylene sulfide fibers having a fineness of 2.0 d, a fiber length of 51 mm, and a number of crimps, 14/inch were formed into a web, and the web was laminated on the both surfaces of the base fabric. With that, this was needle-punched to be a needle felt. The felt was singed with a burner, and then pressed against a hot roll having a surface temperature of 200° C. The filter cloth thus obtained had a Metsuke of 568 g/m² and a thickness of 1.71 mm.

Comparative Example 2

Round cross-section short fibers of polyethylene terephthalate having a fineness of 2.0 d, a fiber length of 51 mm, and a number of crimps, 14/inch were spun into double yarn having a single yarn count of 20 s, and a number of strands, 2. This was woven into plain fabric of polyethylene terephthalate. Next, while being overfed at 220° C., this was heat-set for 45 seconds to be a base fabric having a warp density of 26/inch and a weft density of 18/inch. Y-shaped cross-section fibers of polyethylene terephthalate having a fineness of 1.5 d, a fiber length of 51 mm, and a number of crimps, 14/inch and round cross-section fibers of polyethylene terephthalate having a fineness of 2.0 d, a fiber length of 51 mm, and a number of crimps, 14/inch were blended in a ratio by weight of 90/10 and formed into a web, and the web was laminated on the dust-collecting surface of the base fabric. On the back surface of the base fabric, laminated was a web of round cross-section fibers of polyethylene terephthalate having a fineness of 2.0 d, a fiber length of 51 mm, and a number of crimps, 14/inch. With that, this was needle-punched to be a needle felt. The felt was singed with a burner, and then pressed against a hot roll having a surface temperature of 200° C. The filter cloth thus obtained had a Metsuke of 561 g/m² and a thickness of 1.71 mm.

The dust-collecting capability of the laminates produced in Examples 1 and 2 and Comparative Example 1 was measured according to the method mentioned below. The result is given in Table 1.

[Dust-Collecting Capability]

Dust of group 10 stipulated in JIS-Z-8901 was used. Air containing the dust was filtered through each laminate until the pressure loss through it increased by 20 mmAq. The dust concentration in the air tested was 12 g/m³, and the filtration air flow rate was 1.5 m/min. From the amount of the dust in the air applied to the filter cloth (A) and the amount of the dust having passed through the filter cloth (B), the dust-collecting capability of the filter cloth was obtained according to the following equation.

Dust-Collecting Capability (%)=A/(A+B)

wherein,

A indicates the amount of the dust in the air applied to the filter cloth;

B indicates the amount of the dust having passed through the filter cloth.

The concentration of dust leak through each bag filter is as follows:

Bag filter of cloth of Example 1:1.29 mg/M³.

Bag filter of cloth of Comparative Example 1:4.62 mg/m³.

As in the above, the concentration of dust leak through the bag filter of the dust-collecting filter cloth of Comparative Example 1 is about 3.5 times that of the filter cloth of Example 1.

Further, the dust-collecting filter cloths of Examples 1 to 4 and Comparative Examples 1 to 3 were separately sewed to form bag filters, for which the sewing thread used was prepared by spinning the polyphenylene sulfide short fibers of Example 1 having a fineness of 2.0 d, a fiber length of 51 mm, and a number of crimps, 14/inch into double yarn having a single yarn count of 20 s, and a number of strands, 2. The bag filters had a diameter of 20 cm and a length of 4 m. With each bag filter being fitted thereto, an exhaust gas dust collector was continuously run for 1000 hours to test the bag filter. The test data are given in Table 2.

[Concentration of Dust Leak]

After the dust collector was run for 1000 hours, the concentration of the dust leak through the bag filter was obtained from the overall amount of the dust having passed through the bag filter (A) and the overall amount of the

TABLE 1

|  |  | Example 1 | Example 2 | Comp. Example 1 |
|---|---|---|---|---|
| Constitution of Filter Cloth | Dust-Collecting Surface | 2.0 d-Y 30% 2.0 d-Round 70% | 2.0 d-Y 90% 2.0 d-Round 10% | 2.0 d-Round 100% |
|  | Back Surface |  | 2.0 d-Round 100% |  |
| Dust-Collecting Capability (%) |  | 99.94 | 99.98 | 99.78 |

In the table;

2.0 d-Y means 2.0 denier Y-shaped cross-section fibers, 2.0 d-Round means 2.0 denier round cross-section fibers.

As in Table 1, the duct-collecting capability of the filter cloths of Examples 1 and 2 is higher than that of the filter cloth of Comparative Example 1.

The dust-collecting filter cloths of Example 1 and Comparative Example 1 were separately sewed to form bag filters, for which the sewing thread used was prepared by spinning the polyphenylene sulfide short fibers of Example 1 having a fineness of 2.0 d, a fiber length of 51 mm, and a number of crimps, 14/inch into double yarn having a single yarn count of 20 s, and a number of strands, 2. The bag filters had a diameter of 20 cm and a length of 4 m. Fitted to an exhaust gas dust collector, each bag filter was tested for the following:

[Concentration of Dust Leak]

Dust of group 10 stipulated in JIS-Z-8901 was used. Air containing the dust was filtered through the bag filter until the pressure loss through it increased by 20 mmAq. The dust concentration in the air tested was 12 g/m³, and the filtration air flow rate was 1.5 m/min. From the overall amount of the dust having passed through the bag filter (A) and the overall amount of the air having passed through it (B), the concentration of the dust leak through the bag filter was obtained according to the following equation.

Concentration of Dust Leak (mg/$m^3$)=A/B wherein,

A indicates the overall amount of the dust having passed through the bag filter (mg);

B indicates the overall amount of the air having passed through the bag filter (m³).

exhaust gas having passed through it (B), according to the following equation.

Concentration of Dust Leak (mg/$m^3$)=A/B wherein,

A indicates the overall amount of the dust having passed through the bag filter (mg);

B indicates the overall amount of the exhaust gas having passed through the bag filter (m³).

[Pressure Loss after Dust Removal]

After the dust collector was run for 1000 hours, the dust having adhered onto the bag filter was removed by applying a pressure of 3 kg/cm² thereto, and then the pressure loss through the bag filter was measured. Briefly, a current of air was passed through the bag filter at a flow speed of 1.5 m/min, and the pressure difference between the pressure just after the bag filter and the atmospheric pressure was measured with a manometer (from Yamamoto Electric). This indicates the pressure loss.

[Strength Retention]

After the dust collector was run for 1000 hours, the strength retention of the bag filter was obtained from the tensile strength at break of the bag filter after the running test (A) and the strength at break of the fresh bag filter before the running test (B). To measure the tensile strength at break of the bag filter, used was a Tensilon tensile strength tester. The cloth sample tested had a width of 50 mm; the distance between the fixtures was 100 mm; and the stress rate was 100 mm/min.

Strength Retention (%)=A/B wherein,

A indicates the tensile strength at break of the sample cloth of the bag filter after the 1000-hour running test (kgf/5 cm);

B indicates the tensile strength at break of the sample cloth of the fresh bag filter before the test (kgf/5 cm).

[Exhaust Gas Dust Collector Running Condition]

Dust Concentration: 8 g/m$^3$

Filtration Air Flow Rate: 1.1 m/min

Exhaust Gas Temperature: 160° C.

Exhaust Gas Oxygen Concentration: 8.9 vol. %

Exhaust Gas H$_2$O Concentration: 39.0 vol. %

Exhaust Gas SOx concentration: 72 ppm

Exhaust Gas NOx concentration: 126 ppm

Exhaust Gas HCl concentration: 168 ppm

TABLE 2

|  |  | Example 1 | Example 2 | Example 3 | Example 4 | Comp. Ex. 1 | Comp. Ex. 2 |
|---|---|---|---|---|---|---|---|
| Constitution of Filter Cloth | Dust-Collecting Surface | 2.0 d-Y: 30% 2.0 d-Round: 70% | 2.0 d-Y: 90% 2.0 d-Round: 10% | 1.5 d-Y: 30% 2.0 d-Round: 70 % | 4.0 d-Y: 90% 2.0 d-Round: 10% | 2.0 d-Round: 100% | 1.5 d-Y: 90% 2.0 d-Round: 10% |
|  | Back Surface |  |  | 2.0 d-Round: 100% |  |  |  |
| Material of Filter Cloth |  | Polyphenylene Sulfide |  |  |  |  | PET |
| Concentration of Dust Leak (mg/m$^3$) |  | 0.61 | 0.45 | 0.30 | 0.88 | 2.32 | 0.33 |
| Pressure Loss after Dust Removal (mmAq) |  | 21.3 | 19.5 | 16.3 | 24.2 | 46.1 | 18.2 |
| Strength Retention after 1000-hour running test (%) |  | 88.9 | 88.4 | 87.2 | 88.5 | 89.6 | 48.2 |

In the table;

2.0 d-Y means 2.0 denier Y-shaped cross-section fibers, 2.0 d-Round means 2.0 denier round cross-section fibers, 1.5 d-Y means 1.5 denier Y-shaped cross-section fibers, 4.0 d-Y means 4.0 denier Y-shaped cross-section fibers, PET means polyethylene terephthalate.

As in Table 2, the concentration of dust leak through the bag filters of the cloths of Examples 1 to 4 is low, and the pressure loss through them after dust removal is low. In addition, the strength retention of the bag filters after the 1000-hour running test was high.

INDUSTRIAL APPLICABILITY

Not involving the problem of pressure loss through it, the dust-collecting efficiency of the filter cloth of the invention is high. The bag filter made of the dust-collecting filter cloth of the invention realizes a dust collector having improved dust-collecting efficiency.

What is claimed is:

1. A dust-collecting filter cloth comprising a base fabric and a web, wherein said web comprises modified cross-section fibers of polyphenylene sulfide, said modified cross-section fibers having cross sections being other than circular or oval and selected from the group consisting of Y, V, U, L, triangle and cross shaped sections, wherein said web is disposed on both sides of the base fabric in the form of a dust-collecting side web containing said modified cross-section fibers of polyphenylene sulfide and an opposite side web comprising round cross-section fibers of polyphenylene sulfide.

2. The dust-collecting filter cloth as claimed in claim 1, wherein the web is a fibrous laminate and a surface layer of the dust-collecting side web comprises modified cross-section fibers of polyphenylene sulfide.

3. The dust-collecting filter cloth as claimed in claim 1, wherein the dust-collecting side web comprises said modified cross-section fibers of polyphenylene sulfide.

4. The dust-collecting filter cloth as claimed in claim 1, wherein said dust-collecting side web comprises at least 25% by weight of said modified cross-section fibers of polyphenylene sulfide blended or combined with other fibers.

5. The dust-collecting filter cloth as claimed in claim 1, wherein said dust-collecting side web further contains round cross-section fibers of polyphenylene sulfide, but comprises at least 25% by weight of said modified cross-section fibers of polyphenylene sulfide blended or combined with said round cross-section fibers.

6. The dust-collecting filter cloth as claimed in claim 1, wherein said dust-collecting side web comprises at least 50% by weight of said modified cross-section fibers of polyphenylene sulfide blended or combined with other fibers.

7. The dust-collecting filter cloth as claimed in claim 1, wherein said modified cross-section fibers of polyphenylene sulfide have a Y-shaped cross-section profile.

8. The dust-collecting filter cloth as claimed in claim 1, wherein said modified cross-section fibers of polyphenylene sulfide have a fineness of at most 5 d.

9. The dust-collecting filter cloth as claimed in claim 1, wherein said modified cross-section fibers of polyphenylene sulfide have a fineness of at most 2 d.

10. The dust-collecting filter cloth as claimed in claim 1, wherein at least a surface layer of said dust-collecting side web is of a fibrous laminate having a fineness gradation that decreases in the direction of the thickness of the dust-collecting side web, with the smaller at an upper layer of the laminate.

11. The dust-collecting filter cloth as claimed in claim 1, wherein at least the surface of the dust-collecting side web has a fibrous laminated structure of which the fineness gradation decreases in the direction of the thickness of the dust-collecting side web, to be smaller in the upper layer of the laminate structure.

12. The dust-collecting filter cloth as claimed in claim 1, wherein the surface of said dust-collecting side web is subjected to at least one treatment of singeing and rolling.

13. The dust-collecting filter cloth as claimed in claim 1, wherein said dust-collecting side web is bonded to said base fabric by entangling the fibers constituting the two.

14. A bag filter made of the dust-collecting filter cloth of claim 1.

15. The bag filter as claimed in claim 14, which is sewed with sewing thread, and the surface of said dust-collecting filter cloth is arranged as the dust-collecting surface of said bag filter.

16. The bag filter as claimed in claim 14, which is sewed with sewing thread of polyphenylene sulfide fibers.

* * * * *